Dec. 15, 1942. N. MARCUS Re. 22,235

SUPPORT FOR CONTAINERS

Original Filed Dec. 27, 1937

INVENTOR,
Nathan Marcus.
BY Julian J. Wittel,
his ATTORNEY

Reissued Dec. 15, 1942

Re. 22,235

UNITED STATES PATENT OFFICE 22,235

SUPPORT FOR CONTAINERS

Nathan Marcus, Union City, N. J.

Original No. 2,177,073, dated October 24, 1939, Serial No. 181,815, December 27, 1937. Application for reissue May 31, 1941, Serial No. 396,211

6 Claims. (Cl. 248—150)

This invention relates to stands, or supporting structures, for tanks, particularly of cylindrical hot water tanks used in homes, apartment houses, and like places, and has for its main object to provide a device of this character which will be simple, inexpensive to manufacture, reliable and strong in construction, and which will remain rigid during use and will not get loosened or shaky, as most of the stands or supports now in use for such purposes are apt to do.

Other objects of this invention are: to provide supports for hot water tanks which may be built of few elements, mostly of standard forms, in which the same elements may be used for different sizes in an exchangeable and repetitive manner, and the elements of which may be easily assembled or taken apart for storage and shipping.

Still further objects of this invention will be apparent as the specification of the same proceeds.

In the drawing, forming a part of this specification and accompanying the same:

Fig. 2 is a plan view of one end portion of an embodiment of my device; while

Figure 1:
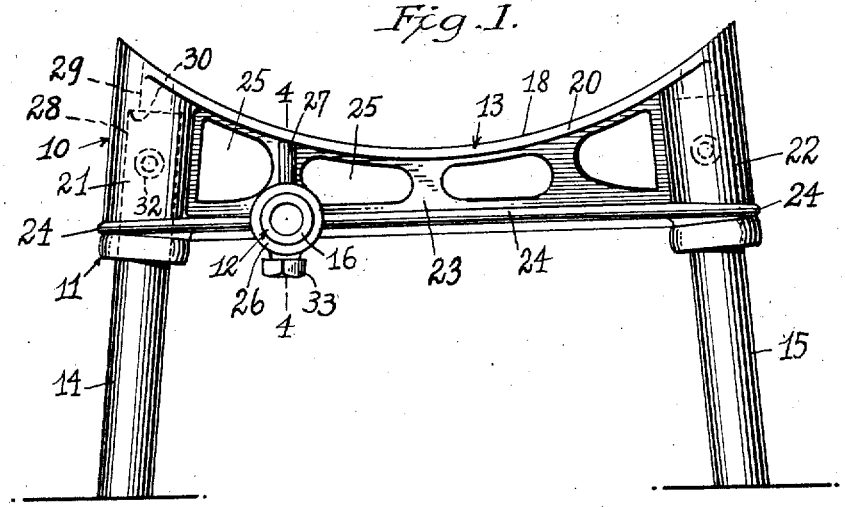
Fig. 1 is an end elevation of my assembled device.
Figure 2:
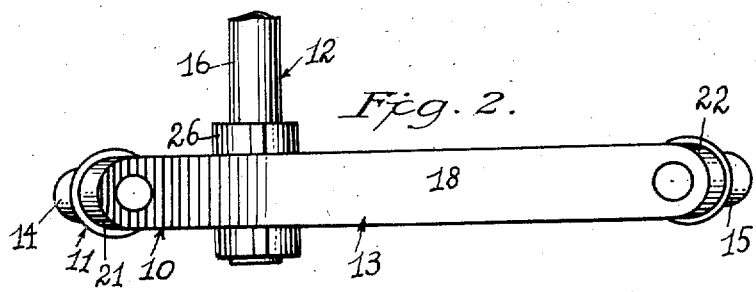
Figure 3:
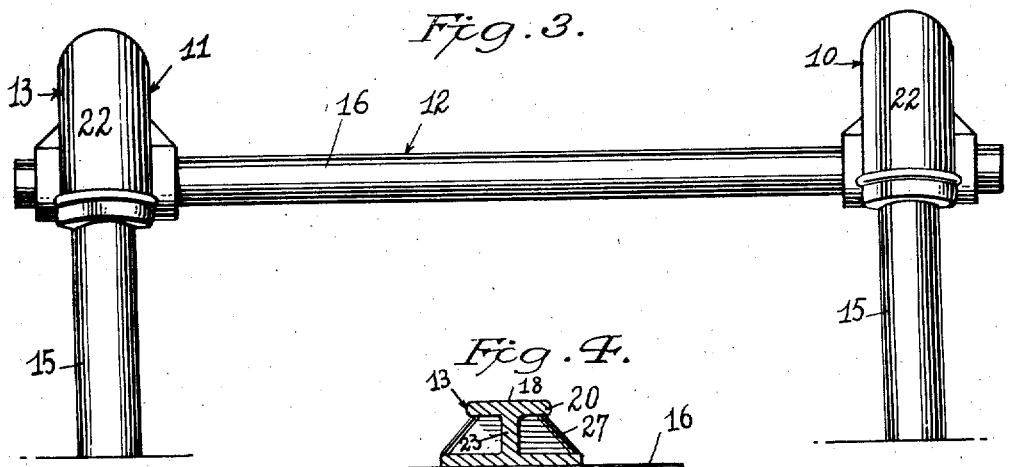
Fig. 3 is an elevational view of my device in which two leg constructions are used for the same.
Figure 4:
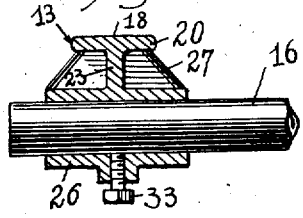
Fig. 4 is a fragmentary sectional elevation on the line 4—4 of Fig. 1.

Referring now to the drawing more closely, by characters of reference, the number 10 indicates my device in general, being composed of vertical supporting elements proper 11, and a horizontally connecting and reinforcing element 12.

In the preferred embodiment of my device, the vertical supporting element proper consists of a casting 13 and two outwardly inclined legs 14 and 15 for the same, the detail construction of which will be more fully described presently, while the horizontal reinforcing and connecting construction is simply composed of a pipe 16.

The casting 13 has an upper curved surface 18, the curvature of which is fitted to a certain type and size of hot water tank so that a large portion of the lower outer surface of said tank may rest in the shaped curved surface 18, and thereby distribute the weight of the tank to a comparatively large surface. Said upper surface 18 is formed on an upper flange 20, the two ends of which are continued in downward tubular portions 21 and 22, said tubes being outwardly inclined, as shown. A vertical web or perforated plate 23 interconnects the two tubes 21 and 22, and a rib or flange 24 on said web also encircles said tubes and reinforces them and the web 23 adjacent to their lower ends. Portions 25 are removed from the web 23. A horizontal tubular or sleeve portion 26 is also provided in the web 23, preferably at the rib 24, and connected to the flange 20 by a rib 27.

Each of the vertical tubular portions 21 and 22 has a longer lower bore 28 of a comparatively larger diameter and may have an upper narrow bore 29, so that a shoulder 30 is formed at the meeting of these two portions.

The vertical supports or legs proper 14 and 15 may preferably be pieces of pipe of appropriate material, diameter and thickness, which will closely fit into the larger holes 28 and will be pushed thereinto until their upper ends will rest against the shoulders 30, whereupon each of such vertical legs may be secured in its position by a set screw 32.

The horizontal connecting and reinforcing member 16 may also preferably be a piece of pipe of appropriate diameter and thickness, which may entirely be pushed through the tube or sleeve 26, and also may be secured in its position by set screw 33.

It will be understood that I may employ a suitable number of vertical supporting structures 11, two of them being shown in the drawing, which is the minimum number thereof, and also may employ a suitable number of horizontal, reinforcing and connecting members 12, one of them only being shown in the drawing.

It also is obvious that in case of a smaller tank, two vertical members 11 and a single connecting horizontal tube 12 may be sufficient, while in case of heavier and larger tanks, several vertical supporting members 11, and two, or even more, horizontal connecting reinforcing members 12 may be provided. In case more than one horizontal supporting member 12 is desired, additional horizontal tubes or sleeves 26 are to be cast on the members 13, said additional sleeves being suitably distributed over the surfaces of said castings and each housing a horizontal member 12.

In case of very heavy and large tanks more than two legs proper 14 and 15 may also be provided for each casting 13, as will be understood.

What I claim as new, is:

1. In a supporting structure for cylindrical tanks, having a plurality of cross members to be placed transversely underneath the tank, and also having a tube formed at each end of each cross member, and a removable leg in each tube, the upper edge of each cross member being concavely curved to provide a resting surface for the tank, in combination, a horizontal sleeve in each cross member open at both ends, said sleeves in the individual members being in a co-axial relation, a horizontal removable connecting elongated element passed through all the sleeves in the individual cross members, means to releasably secure said legs into said tubes, and said connecting element into said sleeves, respectively, an upper flange in alignment with said upper concave surface for each cross member connecting the tubes at the two ends thereof, and a lower flange on each member connecting and encircling said tubes.

2. In a supporting structure for cylindrical tanks, as set forth in claim 1, said sleeves in said cross members being set into the lines of the respective lower flanges, and ribs on said members connecting the respective sleeves with the respective upper flanges.

3. In a supporting structure for cylindrical tanks, having a plurality of cross members to be placed transversely underneath the tank, and also having a tube formed at each end of each cross member, and a removable leg in each tube, the upper edge of each cross member being concavely curved to provide a resting surface for the tank, in combination, a horizontal sleeve in each cross member open at both ends, said sleeves in the individual members being in a so-axial relation, a horizontal removable connecting elongated element passed through all the sleeves in the individual cross members, an upper flange in alignment with said upper concave surface for each cross member connecting the tubes at the two ends thereof, and a lower horizontal flange on each member connecting said tubes.

4. In a supporting structure for cylindrical tanks, having a plurality of cross members to be placed transversely underneath the tank, and also having a tube formed at each end of each cross member, and a removable leg in each tube, the upper edge of each cross member being concavely curved to provide a resting surface for the tank, in combination, a horizontal sleeve in each cross member open at both ends, said sleeves in the individual members being in a co-axial relation, a horizontal removable connecting elongated element passed through all the sleeves in the individual cross members, an upper flange in alignment with said upper concave surface for each cross member connecting the tubes at the two ends thereof, and a lower flange on each member connecting said tubes.

5. In a supporting structure for cylindrical tanks, having a plurality of cross members to be placed transversely underneath the tank, and also having a tube formed at each end of each cross member, and a removable leg in each tube, the upper edge of each cross member being concavely curved to provide a resting surface for the tank, in combination, a horizontal sleeve in each cross member open at both ends, said sleeves in the individual members being in a co-axial relation, a horizontal removable connecting elongated element passed through all the sleeves in the individual cross members, means to releasably secure said legs into said tubes, and said connecting element into said sleeves, respectively, an upper flange in alignment with said upper concave surface for each cross member connecting the tubes at the two ends thereof, and a lower flange on each member connecting and encircling said tubes.

6. In a supporting structure for a container, a plurality of plate-like cross members placed edgewise underneath said container in a spaced apart relation, legs for each cross member, a transverse sleeve projecting from each cross member in a co-axial relation to one another, and a reinforcing and connecting member passed through said sleeves in the individual cross members.

NATHAN MARCUS.